(12) United States Patent
Nagl et al.

(10) Patent No.: US 11,546,645 B2
(45) Date of Patent: Jan. 3, 2023

(54) SYSTEMS, METHODS, AND STORAGE MEDIA FOR AUTHENTICATING A REMOTE VIEWING DEVICE FOR RENDERING DIGITAL CONTENT

(71) Applicant: CBS INTERACTIVE INC., San Francisco, CA (US)

(72) Inventors: Alexander Nagl, San Francisco, CA (US); Forrest McDaniel, San Francisco, CA (US); Francis Bato, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 613 days.

(21) Appl. No.: 16/027,434

(22) Filed: Jul. 5, 2018

(65) Prior Publication Data
US 2019/0313138 A1 Oct. 10, 2019

Related U.S. Application Data

(60) Provisional application No. 62/655,572, filed on Apr. 10, 2018.

(51) Int. Cl.
| | |
|---|---|
| *H04N 21/258* | (2011.01) |
| *H04L 9/40* | (2022.01) |
| *G06F 21/10* | (2013.01) |
| *H04N 21/488* | (2011.01) |
| *H04N 21/41* | (2011.01) |

(52) U.S. Cl.
CPC ....... *H04N 21/25816* (2013.01); *G06F 21/10* (2013.01); *H04L 63/0876* (2013.01); *H04N 21/25875* (2013.01); *H04N 21/4126* (2013.01); *H04N 21/4882* (2013.01); *G06F 2221/0704* (2013.01)

(58) Field of Classification Search
CPC ....... H04N 21/25816; H04N 21/25875; H04N 21/4882; G06F 21/10; G06F 2221/0704; H04L 63/0876
See application file for complete search history.

(56) References Cited

U.S. PATENT DOCUMENTS

| | | | |
|---|---|---|---|
| 9,178,890 B1 * | 11/2015 | Bhimanaik | ............. H04L 63/10 |
| 9,537,661 B2 * | 1/2017 | Khalil | ................. H04L 63/0853 |
| 2007/0180485 A1 * | 8/2007 | Dua | ................... H04N 21/4325 |
| | | | 725/114 |
| 2016/0072789 A1 * | 3/2016 | Loo | ....................... H04L 63/029 |
| | | | 726/7 |
| 2016/0182479 A1 * | 6/2016 | Kaplan | ................. H04L 51/046 |
| | | | 726/6 |
| 2017/0230357 A1 * | 8/2017 | Canfield | ................... A61G 7/07 |

* cited by examiner

*Primary Examiner* — Chenea Davis
(74) *Attorney, Agent, or Firm* — Rimon PC; Marc S. Kaufman

(57) ABSTRACT

Systems, methods, and storage media for authenticating a remote viewing device for rendering digital content are disclosed. Exemplary implementations may: transmit an initial display to be displayed on the viewing device; receive a request, from the viewing device, to view content; transmit an indication of the request to a mobile device associated with a user who is authorized to view the content; receive, from the mobile device, approval of the viewing device for viewing the content; and authenticate the viewing device for viewing the content in response to the approval of viewing device whereby the content can be viewed on the viewing device.

27 Claims, 9 Drawing Sheets

SYSTEMS, METHODS, AND STORAGE MEDIA FOR AUTHENTICATING A REMOTE VIEWING DEVICE FOR RENDERING DIGITAL CONTENT

CROSS-REFERENCE TO RELATED APPLICATION

The present application claims priority to U.S. provisional patent application No. 62/655,572 filed on Apr. 10, 2018, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates to systems, methods, and storage media for authenticating a remote viewing device for rendering digital content.

BACKGROUND

Over the Top (OTT) television applications have become very common. In and OTT implementation, a computing device is integrated with, or coupled to, a television to allow the television to receive content over a network, such as the internet. The content is often part of a paid subscription package or other restricted access mechanism that permits monetization of the content by the content owner and/or distributor (individually and collectively referred to as "distributor" herein). Delivery of content over the internet allows what is sometimes known as "TV Anywhere", i.e. viewing of television content on various devices, such as a laptop computer. To authenticate the various viewing devices of a user, it is common to send a code to a user. The user is then required to log into a web site associated with the distributor and manually enter the code into an interface on the web site. In response to entry of the code by the user, the user's viewing device, such as a set-top box, is authenticated to allow viewing of the content on the viewing device. This can be tedious and confusing to users, often requiring a user laptop or desktop computer to navigate to the web site. The process, described in more detail below, typically takes at least 60 seconds.

FIG. 1 illustrates an example of portions of a conventional sign in using a web site authentication method. Once a user has navigated to a user interface of the viewing device, the user can select content from a user interface for viewing. The user is then presented, on the viewing device, a display such as the screen display 20 shown in FIG. 1, in which a website URL 12 and an authorization code 14 is displayed to the user.

The user then follows the instructions, i.e. logs on to the website, on a separate user device. This can be accomplished through the web browser of a user's computer or mobile device. The user will then log into the web site, using their username and password associated with the user account, and enter the code into an interface on the web site. In response to the login and entry of the authorization code, the user viewing device is authenticated by the content service for viewing of the content and the screen on the user viewing device will be updated to allow the user to navigate to and view specific content. The typical elapsed time of over 60 seconds is a relatively long time for users that are accustomed to on demand access to content.

SUMMARY

One aspect of the present disclosure relates to a system configured for authenticating a remote viewing device for rendering digital content. The system may include one or more hardware processors configured by machine-readable instructions. The processor(s) may be configured to transmit an initial display to be displayed on the viewing device. The processor(s) may be configured to receive a request, from the viewing device, to view content. The processor(s) may be configured to transmit an indication of the request to a mobile device associated with a user who is authorized to view the content. The mobile device may be a device that is different from the viewing device. The mobile device may generate a message to be displayed to the user. The message may prompt the user to approve the viewing device. The processor(s) may be configured to receive, from the mobile device, the approval for viewing the content. The processor(s) may be configured to authenticate the viewing device for viewing the content in response to the approval whereby the content can be viewed on the viewing device.

Another aspect of the present disclosure relates to a method for authenticating a remote viewing device for rendering digital content. The method may include transmitting an initial display to be displayed on the viewing device. The method may include receiving a request, from the viewing device, to view content. The method may include transmitting an indication of the request to a mobile device associated with a user who is authorized to view the content. The mobile device may be a device that is different from the viewing device. The mobile device may generate a message to be displayed to the user. The message may prompt the user to approve the viewing device. The method may include receiving, from the mobile device, the approval of the viewing device for viewing the content. The method may include authenticating the viewing device for viewing the content in response to the approval whereby the content can be viewed on the viewing device.

Yet another aspect of the present disclosure relates to a non-transient computer-readable storage medium having instructions embodied thereon, the instructions being executable by one or more processors to perform a method for authenticating a remote viewing device for rendering digital content. The method may include transmitting an initial display to be displayed on the viewing device. The method may include receiving a request, from the viewing device, to view content. The method may include transmitting an indication of the request to a mobile device associated with a user who is authorized to view the content. The mobile device may be a device that is different from the viewing device. The mobile device may generate a message to be displayed to the user. The message may prompt the user to approve the viewing device. The method may include receiving, from the mobile device, the approval of the viewing device for viewing the content. The method may include authenticating the viewing device for viewing the content in response to the approval whereby the content can be viewed on the viewing device.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 2:
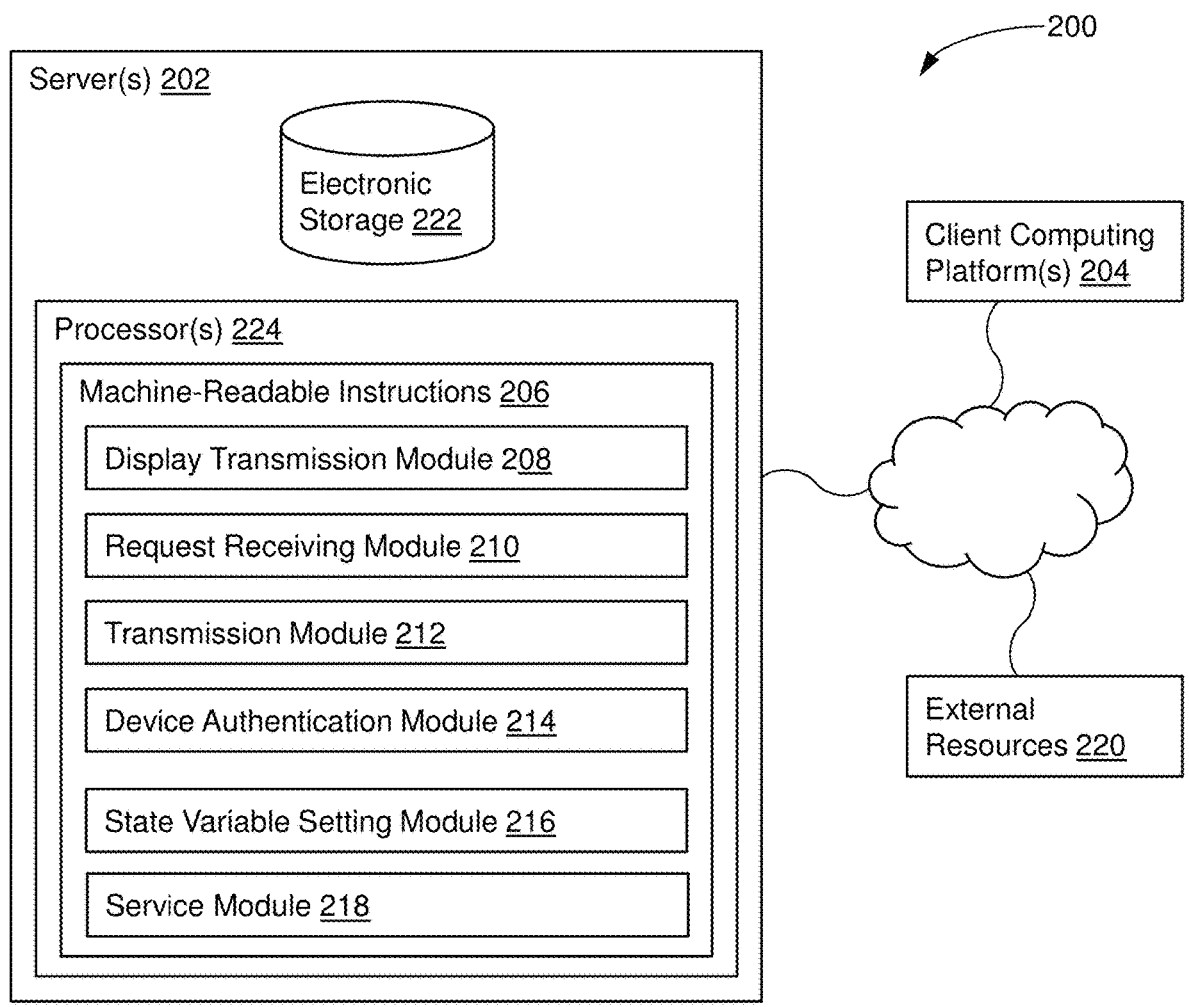
FIG. 2 illustrates a system configured for authenticating a remote viewing device for rendering digital content, in accordance with one or more implementations.

FIG. 2 illustrates a system 200 configured for authenticating a remote viewing device for rendering digital content, in accordance with one or more implementations. In some implementations, system 200 may include one or more servers 202. Server(s) 302 may be configured to communicate with one or more client computing platforms 204 according to a client/server architecture and/or other architectures. Client computing platform(s) 204 may be configured to communicate with other client computing platforms via server(s) 202 and/or according to a peer-to-peer architecture and/or other architectures. Users may access system 200 via client computing platform(s) 204. Client computing platforms include the viewing devices and mobile devices described below. Server(s) 202 and client computing platform(s) 204 can communicate with external resources 220 which are described below. As described in detail below, client computing platforms 204, can each include a viewing device and a mobile device.

Server(s) 202 may be configured by machine-readable instructions 206. Machine-readable instructions 206 may include one or more modules. The modules may include computer program portions executed by one or more computer processors. The modules may include one or more of a display transmission module 208, a request receiving module 220, a transmission module 212, a device authentication module 214, a state variable setting module 216, and/or other instruction modules.

Display transmission module 208 may be configured to transmit an initial display to be displayed on the viewing device that is part of a client computing platform 204.

Request receiving module 210 may be configured to receive a request, from the viewing device, to view content. Indication transmission module 212 may be configured to transmit an indication of the request to view content to a mobile device associated with a user who is authorized to view the content. The indication of the request may include an authorization code that is transmitted to the mobile device. In response to receiving the indication of the request for content, the mobile device can be caused to display a push notification generated in the manner described in detail below. The push notification may provide the user with the option of dismissing the notification, opening an app associated with the content and/or prompt the user to approve the viewing device. State variable setting module 216 may be configured to set a state variable to a state, or otherwise change data in a database, to indicate that the push notification should be generated. The push notification is generated in response to detection of the state of the state variable or other data change. The mobile device may be a device that is different from the viewing device but associated with the user of the viewing device.

Device authentication module 214 may be configured to authenticate the viewing device for viewing the content in response to the user's approval of the viewing device whereby the content can be viewed on the viewing device. Service module 218 may be configured to log in to a service associated with the content.

In some implementations, authenticating the viewing device may include consuming, by the viewing device, a key. In some implementations, the key may include an authorization code. In some implementations, server(s) 202, client computing platform(s) 204, and/or external resources 220 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 202, client computing platform(s) 204, and/or external resources 220 may be operatively linked via some other communication media.

A given client computing platform 204 may include one or more processors configured to execute computer program modules. The computer program modules associated with the given client computing platform 204 allow the client computing platform to interface with system 200 and/or external resources 220, and/or provide other functionality attributed herein to client computing platform(s) 204. By way of non-limiting example, the mobile device of a given client computing platform 204 may include one or more of a desktop computer, a laptop computer, a handheld computer, a tablet computing platform, a NetBook, a Smartphone, a gaming console, and/or other computing platforms. The viewing device of a given client computing platform can be the same device as the mobile device or can be a separate device and can include one or more of a desktop computer, a laptop computer, a handheld computer, a tablet computing platform, a NetBook, a set-top box, a television, a gaming console, and/or other computing platforms.

External resources 220 may include sources of information outside of system 300, external entities participating with system 200, and/or other resources. In some implementations, some or all of the functionality attributed herein to external resources 120 may be provided by resources included in system 200.

Server(s) 202 may include electronic storage 222, one or more processors 224, and/or other components. Server(s)

202 may include communication lines, or ports to enable the exchange of information with a network and/or other computing platforms. Illustration of server(s) 202 in FIG. 2 is not intended to be limiting. Server(s) 202 may include a plurality of hardware, software, and/or firmware components operating together to provide the functionality attributed herein to server(s) 202. For example, server(s) 202 may be implemented by a cloud of computing platforms operating together as server(s) 202.

Electronic storage 222 may comprise non-transitory storage media that electronically stores information. The electronic storage media of electronic storage 222 may include one or both of system storage that is provided integrally (i.e., substantially non-removable) with server(s) 202 and/or removable storage that is removably connectable to server(s) 202 via, for example, a port (e.g., a USB port, a firewire port, etc.) or a drive (e.g., a disk drive, etc.). Electronic storage 222 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 222 may include one or more virtual storage resources (e.g., cloud storage, a virtual private network, and/or other virtual storage resources). Electronic storage 222 may store software algorithms, information determined by processor(s) 224, information received from server(s) 202, information received from client computing platform(s) 204, and/or other information that enables server(s) 202 to function as described herein.

Processor(s) 224 may be configured to provide information processing capabilities in server(s) 302. As such, processor(s) 224 may include one or more of a digital processor, an analog processor, a digital circuit designed to process information, an analog circuit designed to process information, a state machine, and/or other mechanisms for electronically processing information. Although processor(s) 224 is shown in FIG. 2 as a single entity, this is for illustrative purposes only. In some implementations, processor(s) 224 may include a plurality of processing units. These processing units may be physically located within the same device, or processor(s) 224 may represent processing functionality of a plurality of devices operating in coordination. Processor(s) 224 may be configured to execute the function of the modules by software; hardware; firmware; some combination of software, hardware, and/or firmware; and/or other mechanisms for configuring processing capabilities on processor(s) 224. As used herein, the term "module" may refer to any component or set of components that perform the functionality attributed to the module. This may include one or more physical processors during execution of processor readable instructions, the processor readable instructions, circuitry, hardware, storage media, or any other components.

Figure 1:
FIG. 1 illustrates a part of conventional user interface of a convential process for authenticating a viewing device for viewing of content
Figure 1:

It should be appreciated that although the modules are illustrated in FIG. 1 as being implemented within a single processing unit, in implementations in which processor(s) 224 includes multiple processing units, one or more of the modules may be implemented remotely from the other modules. The description of the functionality provided by the different modules described below is for illustrative purposes, and is not intended to be limiting, as any of the modules may provide more or less functionality than is described. For example, one or more of the modules may be eliminated, and some or all of its functionality may be provided by other ones of the modules. As another example, processor(s) 224 may be configured to execute one or more additional modules that may perform some or all of the functionality attributed below to one of modules 208, 210, 212, 214, 216, and/or 218.

Figure 3:
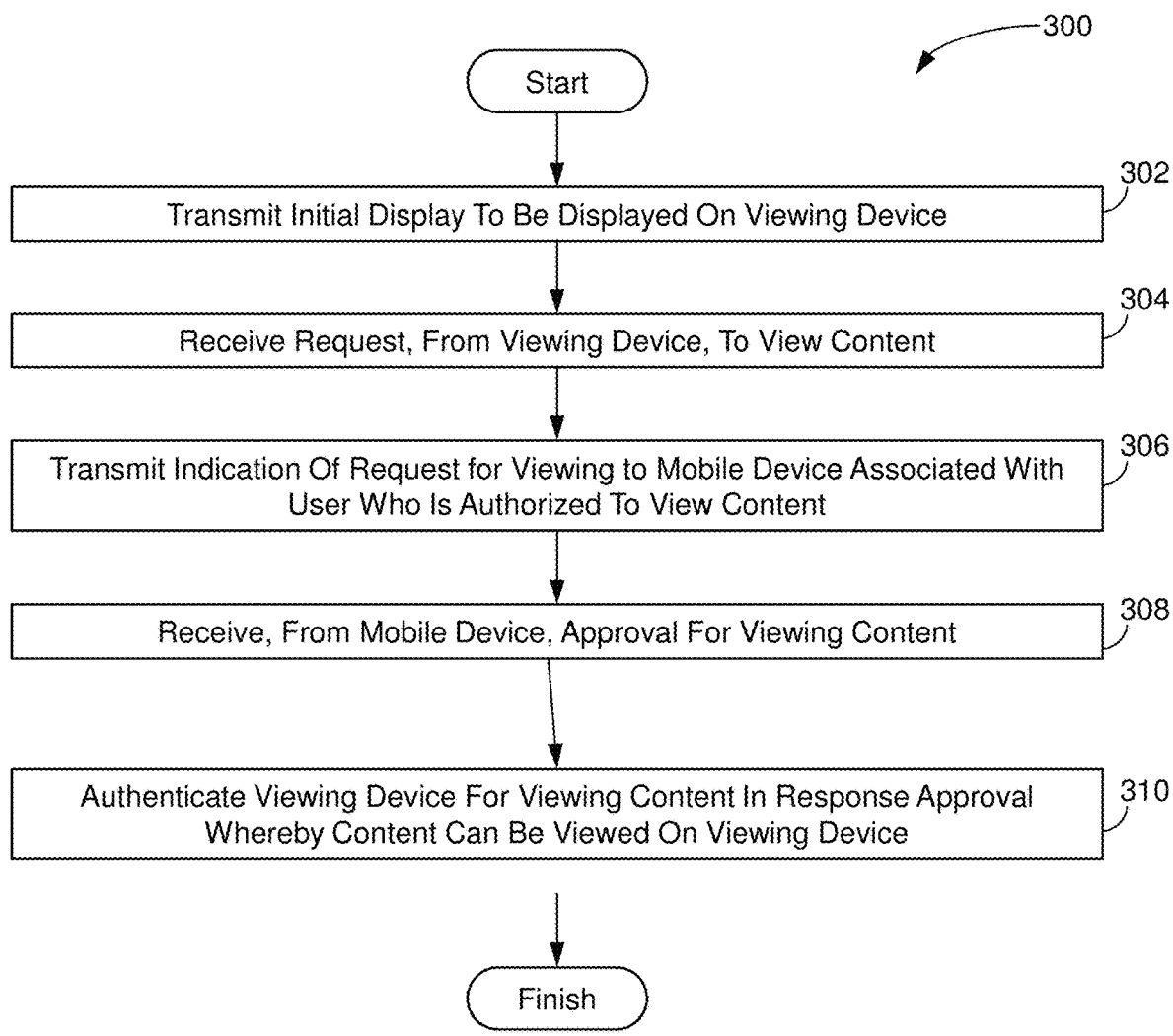
FIG. 3 illustrates a method for authenticating a remote viewing device for rendering digital content, in accordance with one or more implementations.
Figure 4:
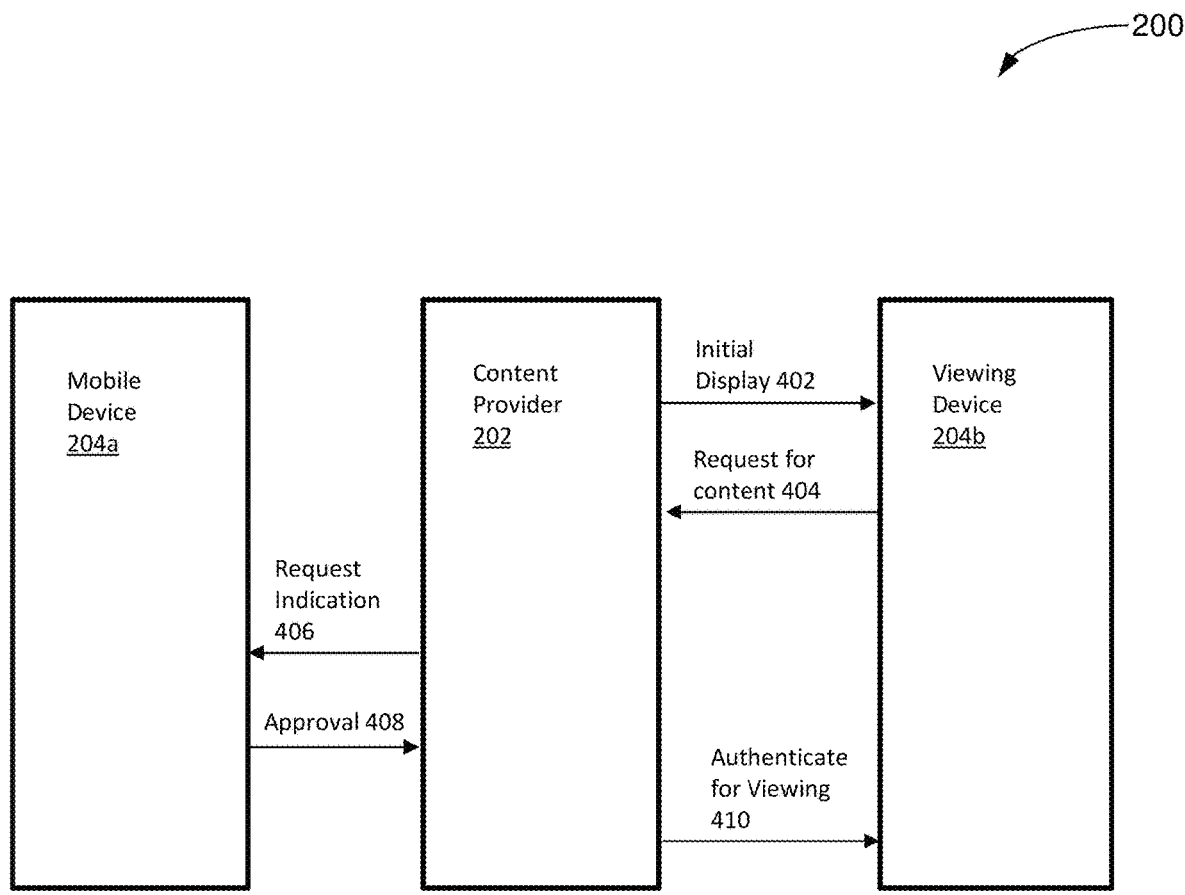
FIG. 4 illustrates the data flow of the method of FIG. 3

FIG. 3 illustrates a method 300, and FIG. 4 illustrates the corresponding data flow in system 200, for authenticating a remote viewing device for viewing digital content, in accordance with one or more implementations. The operations of method 300 and the data flow of system 200 presented below are intended to be illustrative. In some implementations, the method and data flow may be accomplished with one or more additional operations not described, and/or without one or more of the operations discussed. Additionally, the order in of the operations described below is not intended to be limiting.

In some implementations, method 300 may be implemented by system 200 System 200, as shown in FIG. 4 includes three components. Content provider 202 (corresponding to server 202 in FIG. 2), mobile device 204a, and viewing device 204b (in combination corresponding to client computing platform 204 in FIG. 2). External resources 220 (FIG. 2) are not illustrated in FIG. 4.

An operation 302 (and data transmission 402) may include transmitting data to create an initial display to be displayed on the viewing device. As an example, the initial display may be a menu or other interface that permits the user to select content that is desired for viewing immediately or in the future. Operation 302 may be performed by one or more hardware processors configured by machine-readable instructions including a module that is the same as or similar to display transmission module 208, in accordance with one or more implementations. An operation 304 (and data transmission 402) may include receiving a request, from the viewing device, to view selected content. The request from the viewing device can be initiated through a user selection of content through the interface presented as a result of operation 302. Operation 304 may be performed by one or more hardware processors configured by machine-readable instructions including a module that is the same as or similar to request receiving module 220, in accordance with one or more implementations.

An operation 306 (and data transmission 406) may include transmitting an indication of the request for content to a mobile device 204a associated with a user who is authorized to view the content. The mobile device 204a may be a device that is different from the viewing device 204b. The mobile device 204a can be a device that, through a user account, the user has indicated as being associated with the user and/or the viewing device, as described in greater detail below. In response to the indication of the request, the mobile device 204a may generate a message to be displayed to the user. The message may prompt the user to approve authentication of the viewing device. Operation 306 may be performed by one or more hardware processors configured by machine-readable instructions including a module that is the same as or similar to indication transmission module 212, in accordance with one or more implementations. The message generated by the mobile device can be a native notification of the mobile device as described in detail below.

An operation 308 (and data transmission 408) may include receiving, from the mobile device, an approval to authenticate the viewing device for viewing the content. The approval to authenticate can be generated in response to the user acting on the notification as described below. Operation 308 may be performed by one or more hardware processors configured by machine-readable instructions including a module that is the same as or similar to request receiving module 220, in accordance with one or more implementations. An operation 310 (and data transmission 410) may include authenticating the viewing device for viewing the content in response to the approval to authenticate the viewing device whereby the content can be viewed on the viewing device. Operation 310 may be performed by one or more hardware processors configured by machine-readable instructions including a module that is the same as or similar to device authentication module 214, in accordance with one or more implementations.

Figure 5:
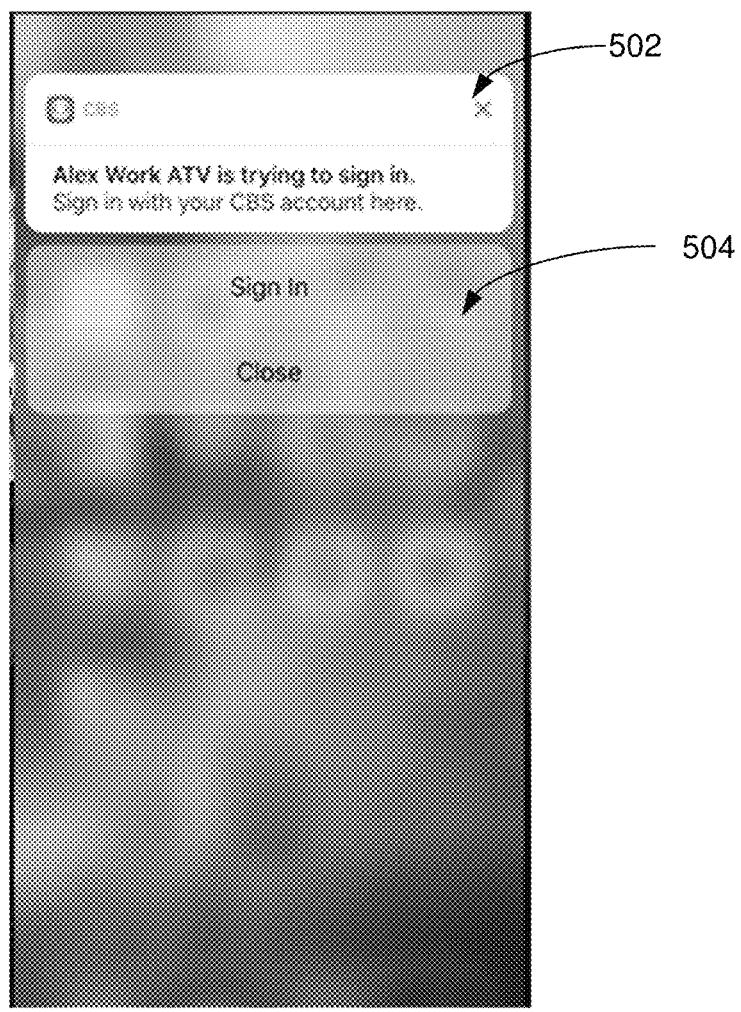
FIG. 5 illustrates a user experience in accordance with an implementation.

FIG. 5 illustrates a portion of the user experience when authenticating a viewing device in accordance with one implementation of the invention. As noted above, the mobile device may generate a message to be displayed to the user. As an example, and as shown in FIG. 5, in response to a user selecting content, such as an individual content item or a subscription, on the viewing device, notification 502 is caused to be displayed on a mobile device associated with the user account. Selection of the notification by the user, such as through touching the notification in a standard touch screen user interface, will cause display of dropdown selection 504. The user can then select SIGN IN or CLOSE. If the user selects SIGN IN, the viewing device is authenticated and the viewing device is then made available for viewing the content. This process typically takes less than 15 seconds. This user experience is far superior to the conventional user experience as there is no need to navigate to a web site, login to the website and enter a code.

The disclosed implementations can leverage the Bonjour™ functionality of IOS and other operating systems, or can use a similar networking protocol. Bonjour™ is Apple's implementation of zero-configuration networking, including service discovery, address assignment, and hostname resolution. Bonjour™ locates devices and the services that those devices offer on a local network using multicast Domain Name System (mDNS) service records. The software comes built-in with Apple's macOS and iOS operating systems and can be installed on computers running the Microsoft Windows™ operating system.

Figure 6:
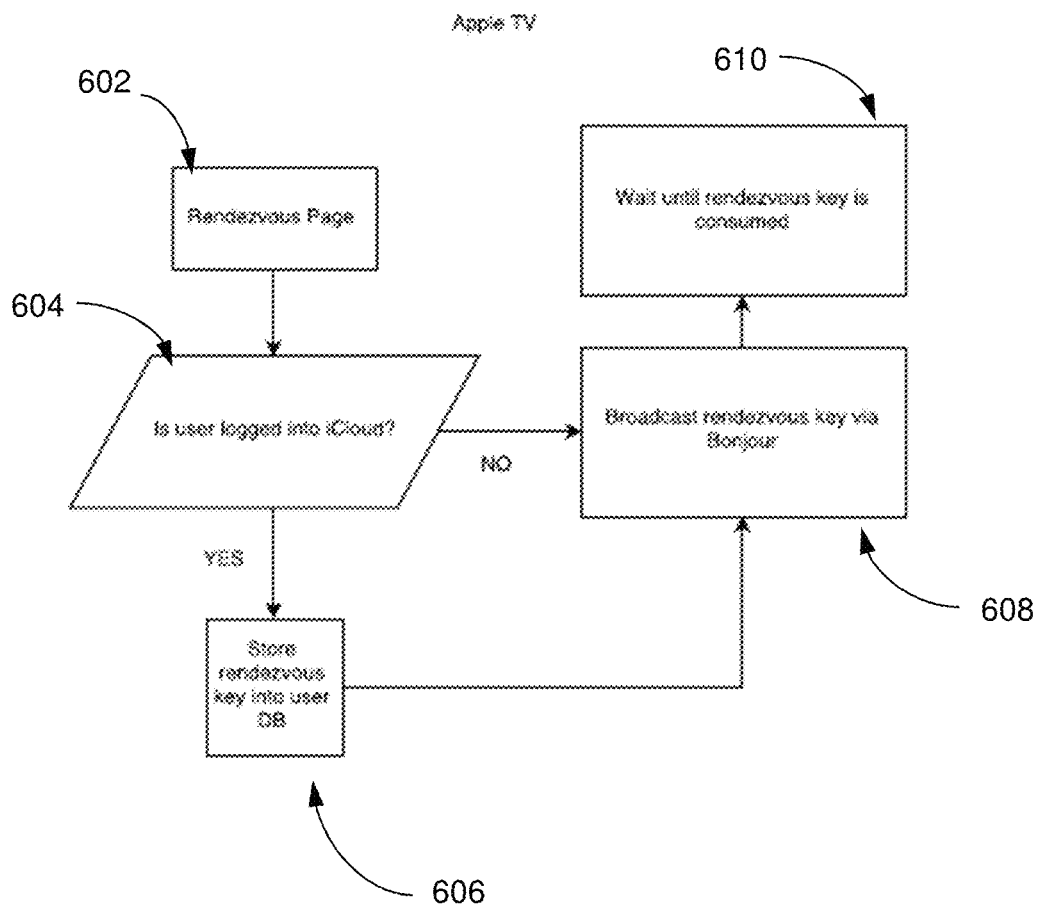
FIG. 6 illustrates a mobile device side implementation where the mobile device is an iPhone™.
Figure 7:
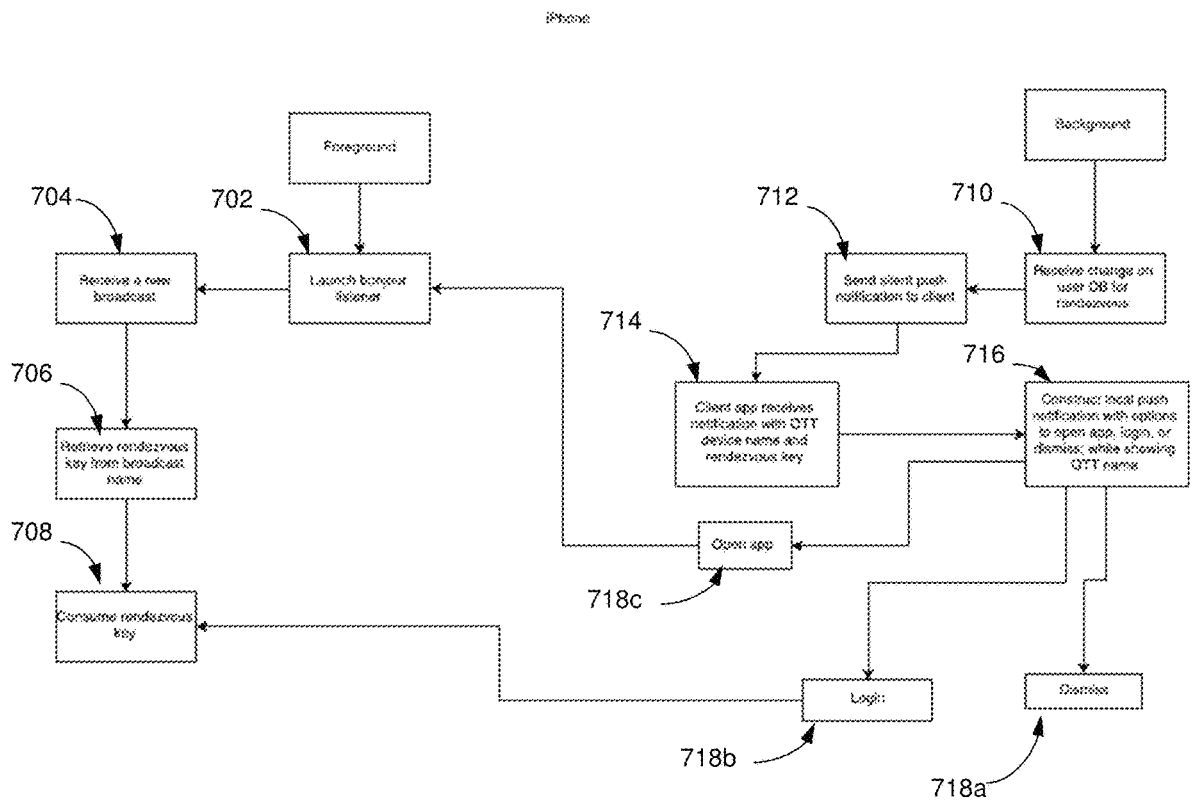
FIG. 7 illustrates a viewing device side implementation where the viewing device includes an Apple TV™.

As noted above, client platform 204 (FIG. 1) can include a viewing device and a mobile device. FIGS. 6 and 7 illustrate the data flow of an implementation in which the viewing device is a set top box such, as an Apple TV™, and the mobile device is an iPhone™. As shown in FIG. 6, which illustrates data flow in the viewing device, when a user navigates to a page of a content service in a Bonjour enabled browser at 602, e.g. the user interface after login to the content service, the viewing device checks to see if the user is logged into iCloud™, or another account service. In the case of iCloud™, the check can be accomplished with a predefined operating system call which returns a specified value indicating whether or not the user is logged in. A bonjour broadcaster starts up whenever the user navigates to a content service page. If the user is signed onto iCloud the Bonjour key is broadcast and the key is set into the iCloud database to be consumed by a notification. If the user choses to log in via the notification, a key is broadcast via Bonjour at 608 and the system waits at 610 until the key has been consumed in the manner described below. The key can include any string, such as a code similar to the conventional system described with respect to FIG. 1. If the user the user is logged in, the key is stored into the user database of the user account, at 606, and broadcast at 608.

As shown in FIG. 7, which illustrates the data flow of the mobile device, when a content provider app is in the foreground on the mobile device, the bonjour listener is launched at 702. If a new key broadcast is received from a viewing device (such as at 608 of FIG. 6) the key is retrieved from the broadcast at 706 and the key is consumed at 708 to authenticate the viewing device. If the content provider app is in the background of the mobile device, the mobile device receives a change in the user database (as a result of 606 of FIG. 6) and sends a silent push notification to the content provider app. at 712 which is received by the content provider app at 714. The silent push notification can include an ID of the viewing device and the key. At 716, the mobile device constructs a local push notification, such as the one illustrated in FIG. 5. The push notification allows the user to dismiss the notification, and terminate the process, at 718a, or login the viewing device, i.e., authenticate the viewing device, to the content provider at 718b and cause the key to be consumed at 708. Note that, while not illustrated in the example of FIG. 5, the push notification can also have an option to open the app at 718c and go through the foreground process described above.

The code set forth below is part of a demo app project for an implementation example created using Apple CloudKit. For the demo project, the bundleID and Constant.WirelessSignin.ContainderID values were changed to not expose the actual confidential values. The app must be setup with push notifications (APNS) and CloudKit documentation for both of which is available through Apple. Various example files of the project are described below with a code listing following the description.

(iOS) AppDelegateiOSSwift.pdf—The AppDelegate that ran on the iOS Demo application. Demonstrates how to set up the Bonjour Wireless sign in as well as CloudKit Database to listen for notifications. Inside of the delegate methods is where the startup and shutdown of the Bonjour listener is happening. As well as listening to and registering for notifications.

```
//
// t
// WirelessSignin
//
// Created by Bato, Francis on 4/5/18.
// Copyright © 2018 CBS. All rights reserved.
//
    import UIKit
    import UserNotifications import CloudKit
    @UIApplicationMain
    class AppDelegate: UIResponder, UIApplicationDelegate { var
window: UIWindow?
// Signin Database manager
    var dbManager: RendezvousDBManager = RendezvousDBManager( )
// The object that receives the notification actions var notificationDelegate:
LocalNotificationDelegate =
    LocalNotificationDelegate( )
```

```
//The Rendezvous listener
      let wirelessSigninner = BluetoothSigninHost( )
      func application(_ application: UIApplication,
didFinishLaunchingWithOptions launchOptions: [UIApplicationLaunchOptionsKey: Any]?)
-> Bool {
// Override point for customization after application launch.
// Register the device for push notifications let center = UNUserNotification-
Center.current( )
      center.requestAuthorization(options:[.badge, .alert, .sound])
      { (granted, error) in
// Enable or disable features based on authorization.
      }
      center.delegate = self.notificationDelegate application.register-
ForRemoteNotifications( )
// For demo only, sets background fetch interval so that device can execute in
thebackground
      UIApplication.shared.setMinimumBackgroundFetchInterval(3600)
// Subscribe this device to any changes that are made to the signin record
// This will allow the device to receive push notfications when changes are made
tothe
// signin record
      dbMa ToRendezvousConfig { isSubscribedin
      t("isSubscribed: \(isSubscribed)")
      }
//Start the listener whenever the app is in forground wirelessSigninner.start-
BrowsingForClients( )
      return true
      }
      func application(_ application: UIApplication, performFetchWithComple-
tionHandler  completionHandler: @escaping (UIBackgroundFetchResult)  ->
Void) {
      completionHandler(.newData)
      }
      func application(_ application: UIApplication, didReceiveRemoteNotification
userInfo: [AnyHashable : Any], fetchCompletionHandler completionHandler:
      @escaping (UIBackgroundFetchResult) -> Void) { let dbNotification =
      CKQueryNotification(fromRemoteNotificationDictionary: userInfo)
// Parse the silent notification of relevant data including
// Device name
// Rendezvous string
// Is the user signed in?
// Is the user on the signin screeen?
      guard let fields = dbNotification.recordFields,
      let device = fields["device_name"] as? String, let rendezvous =
      fields[Constant.WirelessSignin.WirelessSigninStringKey] as? String,
      let on Rendezvous = fields[Constant.WirelessSignin.OnSigninScreenKey]
as? Bool,
      let isLoggedIn = fields[Constant.WirelessSignin.OnSigninLoggedInKey]
as? Bool else { return }
      if !isLoggedIn && on Rendezvous {
      if application.applicationState == .active {
// If app the is open and a silent signin notification is received,
// signin functionality will be deferred to the wireless signin listener
      } else {
// If the app is in the backgorund and a silent signin notification isreceived,
// pass the data to the signin database manager to be consumed into a local
pushnotification
      dbManager.consumeDBSignInNotificationWith(rendezvousString:
rendezvous, deviceName: device, completionHandler: {
      })
      }
      } else {
// If a silent signin notfiication is received and the user is logged in and navigating
away from thesignin
// screen, remove any existing local push notification relevant to signin
      let   center   =   UNUserNotificationCenter.current( )   center
.removeDeliveredNotifications(withIdentifiers:
      [Constant.WirelessSignin.RequestNotificationID])
      if application.applicationState == .active {
// If a silent signin notfiication is received and the user is logged in and navigating
away from thesignin
// screen with the app opened, dismiss the signin actionsheet
self.notificationDelegate.dismissSigninOption {
      completionHandler(.newData)
      }
      } else {
      completionHandler(.newData)
      }
      }
```

-continued

```
        }
        func applicationWillResignActive(_ application: UIApplication) {
// Sent when the application is about to move from active to inactive state. This
can occur for certain types of temporary interruptions (such as an incoming
phone call or SMS message) or when the user quits the application and it begins
the transition to the background state.
// Use this method to pause ongoing tasks, disable timers, and invalidate
graphics rendering callbacks. Games should use this method to pause thegame.
            wirelessSigninner.stopBrowsingForClients( )
        }
        func applicationDidEnterBackground(_ application: UIApplication) {
// Use this method to release shared resources, save user data, invalidate timers,
and store enough application state information to restore your application to its
current state in case it is terminated later.
// If your application supports background execution, this method is called instead
of applicationWillTerminate: when the userquits.
            wirelessSigninner.stopBrowsingForClients( )
        }
        func applicationWillEnterForeground(_ application: UIApplication) {
// Called as part of the transition from the background to the active state; here
you can undo many of the changes made on entering thebackground.
            wirelessSigninner.startBrowsingForClients( )
        }
        func applicationDidBecomeActive(_ application: UIApplication) {
// Restart any tasks that were paused (or not yet started) while the application
was inactive. If the application was previously in the background, optionally refresh
the user interface.
            wirelessSigninner.startBrowsingForClients( )
        }
        func applicationWillTerminate(_ application: UIApplication) {
// Called when the application is about to terminate. Save data if appropriate.
See alsoapplicationDidEnterBackground:.
        }
    }
```

(tvOS) AppDelegatetvOSSwift.pdf—The AppDelegate that ran on the tvOS Demo Application. It is a simple AppDelegate implementation that only initializes and signs into the RendezvousDBManager.

```
//
// t
// WirelessSignintvOS
//
// Created by Bato, Francis on 4/5/18.
// Copyright © 2018 CBS. All rights reserved.
//
    import UIKit
    @UIApplicationMain
class AppDelegate: UIResponder, UIApplicationDelegate { var window:
UIWindow?
// Signin Database manager
        var dbManager: RendezvousDBManager =
        RendezvousDBManager( )
func application(_ application: UIApplication,
didFinishLaunchingWithOptions
launchOptions: [UIApplicationLaunchOptionsKey: Any]?) -> Bool {
let keyStore =
NSUbiquitousKeyValueStore.default keyStore.synchronize( )
        return true
    }
```

(iOS & tvOS) BluetoothSigninSwift.pdf—Holds two different classes: BluetoothSigninHost and BluetoothSigninConnector. BluetoothSigninHost runs on the mobile device, it handles listening for new client's (an Apple TV Device's) rendezvous code and name, and passes it on to be consumed. The BluetoothSigninConnector is run on the Apple TV and it handles broadcasting the rendezvous code and devices name.

```
//
// t - Contains two classes, BluetoothSigninHost and
BluetoothSigninConnector, that combined perform
the Bonjour aspect of wireless signing in.
//   BluetoothSigninHost searches for a code to consume while Blue-
toothSigninConnector broadcasts the code
//   CBS
//
// Created by Nagl, Alexander on 12/10/17.
// Copyright © 2017 CBS Interactive. All rights reserved.
//
    import Foundation
    import MultipeerConnectivity
    struct BluetoothSigninConstants {
static let ServiceType = "Wireless-Signin" //Service type that Bonjour
is searching for
    }
//This class is run on the device that is consuming the Roundezvous code
public class BluetoothSigninHost:
NSObject,MCNearbyServiceBrowserDelegate,
        SignInActionsheet {
static let sharedHost = BluetoothSigninHost( ) //Singleton for the
signinHost
private let peerId = MCPeerID(displayName:
UIDevice.current.name) //Peer ID of this device
private var serviceBrowser : MCNearbyServiceBrowser? = nil //The
service browser that is searching for another device's Rendezvous
code toconsume var isBrowsing = false //Whether or not it is
currently browsing var isAvailable: Bool =true
        deinit {
        self.stopBrowsingForClients( )
        }
func startBrowsingForClients( ){ //Starts the service if !isBrowsing {
        isBrowsing = true
self.serviceBrowser = MCNearbyServiceBrowser(peer: peerId,
serviceType: BluetoothSigninConstants.ServiceType)
self.serviceBrowser?.delegate  =  self
self.serviceBrowser?.startBrowsingForPeers( )
        }
        }
        func stopBrowsingForClients( ){ //Stops the service if i
```

```
        iceBrowser?.stopBrowsingForPeers( )
serviceBrowser?.delegate = nil serviceBrowser = nil isBrowsing = false
        }
    }
//MARK - Browser Delegate
public func browser(_ browser: MCNearbyServiceBrowser,
didNotStartBrowsingForPeers error: Error) {
    }
public func browser(_ browser: MCNearbyServiceBrowser, foundPeer
peerID: MCPeerID, withDiscoveryInfo info: [String : String]?) {
        guard self.isAvailable else { return
        }
if let code = info?["code"]{ //Check to see if the new peer has acode
//If it does get its display name let deviceName = peerID.displayName
presentSignInActionsheet(with: code, deviceName: deviceName)
// Present an action sheet to the user
        }
    }
        public  func  browser(_  browser:  MCNearbyServiceBrowser,
lostPeer peerID: MCPeerID) {
        }
    }
//This class is run on the device that is broadcasting the Roundezvous
code
public class BluetoothSigninConnector:NSObject,
        MCNearbyServiceAdvertiserDelegate{
private let peerId = MCPeerID(displayName: UIDevice.current.name)
//Create the peer ID which is just the devicename
private var serviceAdvertiser : MCNearbyServiceAdvertiser? = nil //Holds
the current advertiser
private var isAdvertising = false //Whether or not it is advertising
func startAdvertisingWith(code: String){ //Start the service with a
Rendezvous for another device to consume
        if isAdvertising { return
        }
        isAdvertising = true
self.serviceAdvertiser = MCNearbyServiceAdvertiser(peer: peerId,
discoveryInfo: ["code":code], serviceType:
BluetoothSigninConstants.ServiceType)
        self.serviceAdvertiser?.delegate = self
        self.serviceAdvertiser?.startAdvertisingPeer( )
    }
func stopAdversiting( ){ //Stops adveritising self.serviceAdvertiser?.stop-
AdvertisingPeer( ) self.serviceAdvertiser?.delegate = nil
self.serviceAdvertiser = nil
        isAdvertising = false
    }
    deinit {
        self.stopAdversiting( )
    }
//Advertiser - Delegates.... None of them need to be used public func
advertiser(_ advertiser:MCNearbyServiceAdvertiser,
        didNotStartAdvertisingPeer error: Error) {
    }
public func advertiser(_ advertiser: MCNearbyServiceAdvertiser,
didReceiveInvitationFromPeer peerID: MCPeerID, withContext
context: Data?, invitationHandler:
@escaping (Bool, MCSession?) -> Void){
        }
    }
```

(iOS & tvOS) ConstantsSwift.pdf—Contains all the constant values that are used throughout the application.

```
//
//
//   WirelessSignin
//
// Created by Nagl, Alexander on 4/5/18.
// Copyright © 2018 CBS. All rights reserved.
//
    struct Constant {
    struct WirelessSignin {
static let ContainderID: String = "iCloud.com.company.wirelessSignIn"
static let
RecordType: String = "SignInType"
static let OnSigninScreenKey: String = "on_signin_screen" static let On-
SigninLoggedInKey: String = "on_signin_logged_in" static let
QueryableKey:
String ="queryable"
    static let DeviceNameKey: String = "device_name"
static let WirelessSigninStringKey: String = "wireless_signin_code"
static let CategoryID: String = "WirelessSigninQuickSigninCategory"
static let SignInActionID: String = "SignIn"
    static let CloseActionID: String = "Close"
    static let RequestNotificationID: String = "WirelessSignin"
    }
```

(iOS) LocalNotificationDelegateSwift.pdf—Implements the UNUserNotificationCenterDelegate that handles user responses to notification messages:

```
SignIn, Dismiss, Open.
//
// egate.swift
//   CBS
//
// Created by Bato, Francis on 1/23/18.
// Copyright © 2018 CBS Interactive. All rights reserved.
//
    import UIKit
    import UserNotifications
    #if os(iOS)
class LocalNotificationDelegate: NSObject,
UNUserNotificationCenterDelegate
{
    @available(iOS 10.0, *)
func userNotificationCenter(_ center: UNUserNotificationCenter,
didReceive response:
UNNotificationResponse, withCompletionHandler completionHandler:
    @escaping ( ) -> Void) {
    switch response.actionIdentifier {
    case Constant.WirelessSignin.SignInActionID:
// This button allows the user to signin from the notification itself
if let  r  =  response.notification.request.content.userInfo[Con-
stant.WirelessSignin.WirelessSigninStringKey] as? String {
RendezvousSimulator.shared.signUserInWith(userName:
UIDevice.current.name, code: r)
    }
    case Constant.WirelessSignin.CloseActionID:
    // Dismiss notification if closed break
    default:
    // User has tapped on the notification
    // This will cause the app to open
    // and will present the signin actionsheet
    // Could also log in the user with this
// method the same as Constant.WirelessSignin.SignInActionID if let r =
response.notification.request.content.userInfo[Constant.Wirele
ssSignin.WirelessSigninStringKey] as? String,
let  d  =  response.notification.request.content.userInfo[Constant.Wi
relessSignin.DeviceNameKey] as? String {
presentSignInOption(rendezvousString: r, deviceName: d, completion: {
    completionHandler( )
    })
    }
    break
    }
    }
    vailable(iOS 10.0, *)
    ed delegate method
func userNotificationCenter(_ center: UNUserNotificationCenter,
willPresent notification:
UNNotification, withCompletionHandler completionHandler:
@escaping (UNNotificationPresentationOptions) -> Void)
{ completionHandler(.alert)
    }
func presentSignInOption(rendezvousString: String, deviceName:
String, completion: SigninCompletion? = nil) {
// Adds haptic feedback when actionable signin is presented,
not strictly necessary
    if #available(iOS 10.0, *) {
    let impact = UIImpactFeedbackGenerator( ) impact.impactOccurred( )
    }
presentSignInActionsheet(with: rendezvousString, deviceName:
```

```
deviceName, completion: {
  completion?( )
  })
}
// Dismiss logic for the signin action sheet
func dismissSigninOption(completion: @escaping SigninCompletion)
{ if let alert
=
UIApplication.shared.keyWindow?.rootViewController?.presented-
ViewController as? UIAlertController,
let message = alert.message, message.contains("Would you like
to sign in") {
  alert.dismiss(animated: true, completion: { completion( )
  })
}
}
}
extens : SignInActionsheet { }
#endif
```

(iOS & tvOS) RendezvousDBManagerSwift.pdf—Provides the connection between the Application and the users iCloud Account. Registers for notification when the database changes. As well as create the silent push notification which later turns into a local notification.

```
//
// swift
// CBS
//
// Created by Bato, Francis on 1/18/18.
// Copyright © 2018 CBS Interactive. All rights reserved.
//
  import Foundation import CloudKit
  import UserNotifications import UIKit
typealias SigninEmailCompletion = (String?) -> Void typealias
SigninRecordCompletion = (CKRecord?) -> Void typealias
SigninCompletion = ( ) -> Void
  typealias SigninSubscriptionCompletion = (Bool) -> Void
  class RendezvousDBManager: NSObject {
// Stubbed variable to represent user business logic
// This variable represents valid user credentials var isAvailable: Bool =
true
// Database identifiers
let container = CKContainer(identifier: Constant.WirelessSignin.Con-
tainerID)
let privateDB = CKContainer(identifier:
  Constant.WirelessSignin.ContainerID).privateCloudDatabase
// Record type for wireless signin
  let recordTypeString: String = Constant.WirelessSignin.RecordType
// Retrieve a wireless signin record from the user's private database func
fetchRendezvousConfig(rendezvousCode: String? = nil,completion:
  SigninRecordCompletion? = nil) {
let query = CKQuery(recordType: recordTypeString, predicate:
NSPredicate(format: "\(Constant.WirelessSignin.QueryableKey) = %@",
NSNumber(value: true)))
privateDB.perform(query, inZoneWith: nil) { record, error in
guard let r = record?.first else {
// If no record exists, create a new one
self.createNewRendezvousConfig(rendezvousCode: rendezvousCode,
  completion: { record in completion?(record)
  })
  return
}
completion?(r)
}
}
#if os(iOS)
// Subscribe to any changes made to a wireless signin record
  func subscribeToRendezvousConfig(completion: SigninSubscription-
Completion?
  = nil) {
  isDBSignInAvailable { [weak self] available in guard available else
{
  completion?(false) return
}
// Retrieve a signin record if one exists    self?.fetchRendez-
vousConfig(rendezvousCode: nil) { [weak self]
  record in
  guard let strongSelf = self else { completion?(false)
  return
}
let predicate = NSPredicate(format: "TRUEPREDICATE") if #availa-
ble(iOS   11.0, *) {
// Create a push notification trigger when the wireless signin record
  changes
  let    subscription    =    CKQuerySubscription(recordType:
  strongSelf.recordTypeString,   predicate:   predicate,   options:
  .firesOnRecordUpdate)
  let infok = CKNotificationInfo( )
// Data that should be included in the push notifications:
// Rendezvous string
// Device name
// Is the user on the signin screen?
// Is the user logged in?
infok.shouldSendContentAvailable = true infok.shouldSendMutableCon-
tent = true    infok.desiredKeys =
  [Constant.WirelessSignin.WirelessSigninStringKey,
  Constant.WirelessSignin.DeviceNameKey,
  Constant.WirelessSignin.OnSigninScree nKey,
  Constant.WirelessSignin.OnSigninLogge dInKey]
// This is a silent notification, so do not update app badge numbers
  infok.shouldBadge = false subscription.notificationInfo = infok
// Save this subscription to the user's private database self?.pri-
vateDB.save(subscription) { subscription, error in
  guard let _ = subscription else { if let er = error,
  er.localizedDescription.contains("duplicate") { completion?(true)
  return
}
completion?(false) return
}
}
} else
{
completion?(true)
completion?(false)
}
}
}
}
#endif
// Are the user's databases accessible on this device?
// For iOS, are they logged into their iCloud account
func isDBAccessible(completion: SigninSubscriptionCompletion? = nil)
{
  CKContainer.default( ).accountStatus { accountStatus,
error in switch
  accountStatus {
  case .available: completion?(true)
  default:
  completion?(false)
}
}
}
// Is wireless signin enabled?
// There is typically business logic that would determine whether this
  functionality is    enabled
  func isDBSignInAvailable(completion: SigninSubscriptionCompletion? =
  nil)  {  isDBAccessible( ) { available in
// Stubbed business logic that would determine if user logged in
completion?(self.isAvailable)
}
}
#if os(tvOS)
// Update an existing signin record with the approriate data
func update(onRendezvous: Bool, rendezvousCode: String? = nil, logge-
dIn:
Bool = false, completion: SigninCompletion? = nil){
// Only update if user database is accessible isDBSignInAvailable( )
{ [weak self]
available in
  if available {
// Retrieve the signin record self?.fetchRendezvousConfig(rendezvousCode:
rendezvousCode)
  { record in
  guard let rec = record else { completion?( )
```

-continued

```
    return
  }
// Capture state of OTT device and update signin record accordingly
rec.setValue(NSNumber(value:  onRendezvous),
forKey:  Constant.WirelessSignin.OnSigninScreenKey)
rec.setValue(NSNumber(value: loggedIn), forKey:
Constant.WirelessSignin.On-
SigninLoggedInKey)
rec.setValue(NSString(string: UIDevice.current.name), forKey:
Constant.WirelessSignin.DeviceNameKey)
    if let r = rendezvousCode { rec.setValue(NSString(string: r), forKey:
    Constant.WirelessSignin.WirelessSigninStringKey)
    }
// Commit changes to private database self?.privateDB.save(rec, comple-
tionHandler: { record,
    error in
    completion?( )
  })
  }
  } else {
  completion?( )
  }
  }
  }
  #endif
// Create a new signin record
    func createNewRendezvousConfig(rendezvousCode: String? = nil, com-
pletion: SigninRecordCompletion? = nil) {
    let record = CKRecord(recordType: recordTypeString)
// Rendezvous string
    record.setValue(NSString(string: rendezvousCode ?? ""), forKey: Con-
stant.WirelessSignin.WirelessSigninStringKey)
// Device name
    record.setValue(NSString(string: UIDevice.current.name), forKey: Con-
stant.WirelessSignin.DeviceNameKey)
// Debug field allows for query on databse dashboard    record.set-
Value(NSNumber(value: true), forKey:
    Constant.WirelessSignin.QueryableKey)
// Is user signed in? record.setValue(NSNumber(value: false),  forKey:
    Constant.WirelessSignin.OnSigninLoggedInKey)
// Is user on signin screen? record.setValue(NSNumber(value:   true),
forKey:
    Constant.WirelessSignin.OnSigninScreenKey)
    privateDB.save(record) { record, error in completion?(record)
    }
  }
  #if os(iOS)
// Create a local push notification from the silent signin push    notifica-
tion
    func consumeDBSignInNotificationWith(rendezvousString:    String,
    deviceName: String, completionHandler: @escaping ( ) -> Void) {
    if #available(iOS 10.0, *) {
    let content = UNMutableNotificationContent( )
    content.title = "\(deviceName) is trying to sign in." content.body =
"Sign in with your account here." content.sound =
UNNotificationSound.default( )
    content.categoryIdentifier = Constant.WirelessSignin.CategoryID
// Include the rendezvous string and device name into the local
push notification
content.userInfo = [Constant.WirelessSignin.WirelessSigninStringKey:
rendezvousString,
    Constant.WirelessSignin.DeviceNameKey: deviceName]
    // Allows the user to sign into their account without opening the app
let    signInAction    =    UNNotificationAction(identifier:
Constant.WirelessSignin.SignInActionID, title:
Constant.WirelessSignin.SignInActionID, options:
[UNNotificationActionOptions.authenticationRequired])
    // Allows the user to dismiss the notification
let    closeAction    =    UNNotificationAction(identifier:
Constant.WirelessSignin.CloseActionID, title:
Constant.WirelessSignin.CloseActionID, options: [ ])
    var category: UNNotificationCategory if #available(iOS 11.0, *)
    {category = UNNotificationCategory(identifier:
Signin.CategoryID, actions: [signInAction, closeAction],
intentIdentifiers: [ ], hiddenPreviewsBodyPlaceholder:
"Notification", options: [ ])
    } else {
category = UNNotificationCategory(identifier:
Constant.WirelessSignin.CategoryID, actions:
[signInAction, closeAction], intentIdentifiers: [ ], options: [ ])
```

```
    }
// Trigger the local push notification with a delay of 1 second,
non-repeating
    let trigger = UNTimeIntervalNotificationTrigger(timeInterval: 1,
repeats: false)
    let request = UNNotificationRequest(identifier:
Constant.WirelessSignin.RequestNotificationID, content:
content, trigger: trigger)
    let center = UNUserNotificationCenter.current( )
center.setNotificationCategories(Set([category]))
// Add the local notification to the notification queue center.add(request,
withCompletionHandler: { error in
    completionHandler( )
  })
  } else {
completionHandler( )
  }
  }
  #endif
  }
```

(iOS & tvOS) RendezvousSimulatorSwift.pdf—A backend simulator we used in the demo application. Emulates a backend sign-in service for rendezvous.

```
//
// Simulates backend Rendezvous functionality for the app
//   WirelessSignin
//
// Created by Nagl, Alexander on 4/5/18.
// Copyright © 2018 CBS. All rights reserved.
//
    import UIKit import CloudKit
        typealias RendezvousReturnCode = (String) -> Void //String is the
    Rendezvous code
        typealias RendezvousCodeConsumtion = (String, Bool) -> Void // String
    is the user name, Bool is if it has been signed in ornot
    public class RendezvousSimulator: NSObject { static let shared =
    RendezvousSimulator( )
        //Simulating backend
    private    let    container    =    CKContainer
    (identifier:    Constant.WirelessSignin.ContainderID)
    private    let    privateDB    =    CKContainer(identifier:
Constant.WirelessSignin.ContainderID).privateCloudDatabase
    //Keys in the user's cloud kit that are emulating what backend
    would be doing
        var iCloudKeyStore: NSUbiquitousKeyValueStore? =
        NSUbiquitousKeyValueStore.default    var    currentCode:
    String = ""
        let userNameCloudKitKey = "wireless_signin_username"
        let didAuthenticateCloudKitKey =
    "wireless_signin_didAuthenticate"
    let rendezvousCodeCloudKitKey = "wireless_signin_code"
        var backgroundTask = UIBackgroundTaskInvalid
        #if os(tvOS)
    //This functionality in this function could be replaced with a
    backend call that
    assigns the OTT device with a Rendezvous code and then returns
    that value in the completion
        func getRendezvousCode(completion: RendezvousReturnCode){
        let randomNumber = Int(arc4random_uniform(10000)) //Random num-
ber
    between 0 and 9999
        currentCode = String(format: "%04d", randomNumber) completion(cur-
rentCode)
        }
    //This functionality in this function could be replaced with a backend
    call to check and see if the RendezvousCode has been consumed and
    retreive the necessary cookies to sign-in the OTT device
        func hasCodeBeenConsumed(completion: @escaping
    RendezvousCodeConsumtion){
    //Check from "Back End" if the key has been authenticated and we are
    now signedin
        fetchLoginConfig { [weak self] record in guard let r = record else {
        completion("", false) return
        }
        let didAuthenticate = r.object(forKey:
```

-continued

```
(self?.didAuthenticateCloudKitKey)!)
as! Bool
    let userName = r.object(forKey:(self?.userNameCloudKitKey)!) as!
    String
    let code = r.object(forKey:(self?.rendezvousCodeCloudKitKey)!) as!
    String
    if didAuthenticate,
    code == self?.currentCode { completion(userName, didAuthenticate)
    } else {
    completion("", false)
    }
    }
    }
    }
    #endif
//This functionality in this function could be replaced with a backend
call to assign the rendezvous code with the current signed in user on the
mobile device based on the cookie on the mobile device
    func signUserInWith(userName: String, code: String){    createLog-
inConfig(rendezvousCode: code, userName: userName)
    }
// Backend mock to simulate a signin endpoint
    func createLoginConfig(rendezvousCode: String, userName: String) {
    self.backgroundTask =
    UIApplication.shared.beginBackgroundTask(expirationHandler: {
    UIApplication.shared.endBackgroundTask(self.backgroundTask)
    self.backgroundTask = UIBackgroundTaskInvalid
    })
// Retrieve login state fetchLoginConfig { record in
    var updatedRecord: CKRecord
    if let r = record {
    updatedRecord =
    } else {
    updatedRecord = CKRecord(recordType: "LoginConfig")
    }
// Capture login state and update database with the following
// Rendezvous string
// Device name
// Does the rendezvous string on the OTT device match what is
received by the client?
updatedRecord.setValue(NSString(string: rendezvousCode),
forKey: self.rendezvousCodeCloudKitKey)
updatedRecord.setValue(NSString(string: userName), forKey:
self.userNameCloudKitKey)
updatedRecord.setValue(NSNumber(value: true), forKey:
self.didAuthenticateCloudKitKey)
    DispatchQueue.global(qos: .default).async {
    // Save to databse
    self.privateDB.save(updatedRecord) { record, error in
// Extend background execution time so that the app does not time out
// when user taps signin on the notification UIApplication.shared.endBack-
groundTask(self.backgroundTask)    self.backgroundTask    =
UIBackgroundTaskInvalid
    }
    }
    }
    }
// Retrieve login state from database
func fetchLoginConfig(completion: SigninRecordCompletion? = nil)
{ let query = CKQuery(recordType: "LoginConfig", predicate:
NSPredicate(format: "\(didAuthenticateCloudKitKey) = %@",
NSNumber(value: true)))
privateDB.perform(query, inZoneWith: nil) { record, error in
completion?(record?.first)
    }
    }
    }
```

(iOS) & (tvOS) SigninProtocolsSwift.pdf—Creates the Alert ActionSheets that give the user the ability to sign into an apple tv via their iPhone while the application is open.

```
//
// t
// CBS
//
// Created by Bato, Francis on 2/5/18.
// Copyright © 2018 CBS Interactive. All rights reserved.
```

```
//
    import Foundation import UIKit
    typealias SigninActionCompletion = ( ) -> Void
// Protocol that allows presentation of an actionsheet for
signin protocol SignInActionsheet { }
    extension SignInActionsheet {
        // This is a stubbed variable that would respresent
// whether this functionality is enabled for the current user var
isAvailable: Bool {
    return true
    }
//Create an action sheet for the mobile user to decide on whether
to sign in the OTT device ornot
func presentSignInActionsheet(with rendezvousCode:
String, deviceName:
String, completion: SigninActionCompletion? = nil) {
let alert = UIAlertController(title: "Sign in to " + deviceName,
message: "Would you like to sign in to \(deviceName) with your current
account?", preferredStyle:
UIAlertControllerStyle.actionSheet)
    // Action that allows user to signin into their account
let signin = UIAlertAction(title: "Yes", style: .default) { (_) in
guard self.isAvailable
else { return}
//Call the backend API to sign the OTT device with the
following rendezvousCode and currentuserName
//For Demo-purposes we use the device name as the user name
RendezvousSimulator.shared.signUserInWith(userName:
    UIDevice.current.name, code: rendezvousCode)
    }
    // Action to dismiss the actionsheet
    let dismiss = UIAlertAction(title: "No", style: .destructive) { (_) in
    }
    // Add the available actions to the actionsheet ction(signIn)
    rt.addAction(dismiss)
    // Present the actionsheet to the user
UIApplication.shared.keyWindow?.rootVi ?.present(alert,
animated: true, completion:{
completion?( )
    })
    }
    }
```

(iOS) ViewControlleriOSSwift.pdf—The iOS landing ViewController for the demo application

```
//
// wift
// WirelessSignin
//
// Created by Bato, Francis on 4/5/18.
// Copyright © 2018 CBS. All rights reserved.
//
    import UIKit
    class ViewController: UIViewController {
// Signin Database manager
    let dbManager: RendezvousDBManager = RendezvousDBMan-
ager( )
    override func viewDidLoad( ) { super.viewDidLoad( )
// Do any additional setup after loading the view, typically from a nib.
    }
```

(tvOS) ViewControllertvOSSwift.pdf—The ViewControllers that the tvOS app uses. Starts the broadcast of the rendezvous code as well as updating the CloudKit database when the user is on the EndViewController inside of the viewDidAppear.

```
//
// wift
// WirelessSignintvOS
//
// Created by Bato, Francis on 4/5/18.
// Copyright © 2018 CBS. All rights reserved.
```

-continued

```
//
   import UIKit
// This view represents the state before a user has decided to sign into
their
account on the OTTdevice
class StartViewController: UIViewController { override func
viewDidLoad( ) {
   super.viewDidLoad( )
// Do any additional setup after loading the view, typically from a nib.
   }
   @IBOutlet weak var onSignIn: UIButton!
   @IBAction func onSignin(_ sender: UIButton) {
if let vc = storyboard?.instantiateViewController(withIdentifier:
"EndViewController") {
   navigationController?.pushViewController(vc, animated: true)
   }
   }
override func viewDidAppear(_ animated: Bool)
{ super.viewDidAppear(animated)
   RendezvousSimulator.shared.currentCode = ""
   }
   }
   }
// This view presents the state when a user has decided to sign
in on their OTT
device
// This screen will display the rendezvous string class EndViewController:
UIViewController {
   @IBOutlet weak var codeLabel: UILabel!
   //The Rendezvous listener
   let wirelessSigninner = BluetoothSigninConnector( )
   // Signin Database manager
let dbManager: RendezvousDBManager = RendezvousDBManager( )
over c
viewDidLoad( ){
   per.viewDidLoad( )
   }
override func viewDidDisappear( animated: Bool)
{ super.viewDidAppear(animated)
self.wirelessSigninner.stopAdvertising( )
// Capture user state of OTT device and update signin record
accordingly --
// user navigating away from the signin screen, with no
rendezvous string present, and checks whether user has signedin
self.dbManager.update(onRendezvous: false, rendezvousCode:
nil, loggedIn:
self.codeLabel.text?.contains("Successfully") ?? false, completion: {
   })
   }
override func viewDidAppear(_ animated: Bool)
{ super.viewDidAppear(animated) codeLabel.text = ""
//Get the Rendezvous code to be displayed RendezvousSimula-
tor.shared.getRendezvousCode { [weak self] (code) in
codeLabel.text = "Rendezvous Code Is: " + code //Display it
self?.wirelessSigninner.startAdvertisingWith(code: code) //Start
   advertising it
self?.checkForCodeChangeIn(secounds: 1) //Fire an update check
in 1 second
// Capture user state of OTT device and update signin record
accordingly --
// user is currently on the signin screen, with a rendezvous string
present, and not logged in
self?.dbManager.update(onRendezvous: true, rendezvousCode: code,
loggedIn: false, completion: {
   })
   }
   }
func checkForCodeChangeIn(secounds: Double){
DispatchQueue.main.asyncAfter(deadline: .now( ) + secounds) {
//Check if the code has been consumed
RendezvousSimulator.shared.hasCode-
BeenConsumed(completion: {[weak
   self] (username, success) in if success { //If it has...
//Update the information the user sees self?.codeLabel.text = "Successfully
Signed In As: " +
   username self?.wirelessSigninner.stopAdversiting( )
   }else{
```

```
self?.checkForCodeChangeIn(secounds: 5)
   }
   })
   }
   }
   }
```

Figure 8:
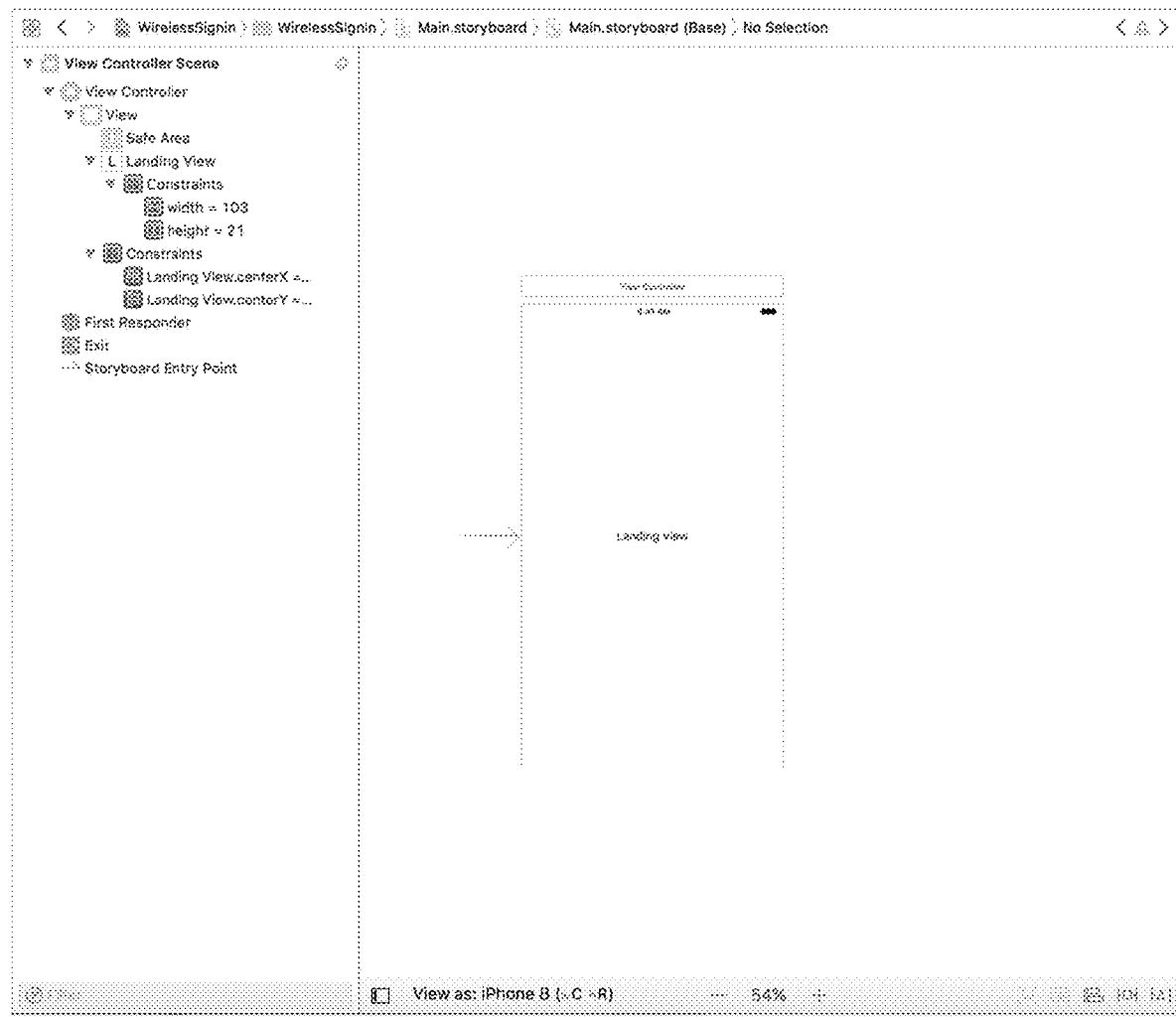
FIG. 8 illustrates an example of the iOS App storyboard.
Figure 9:
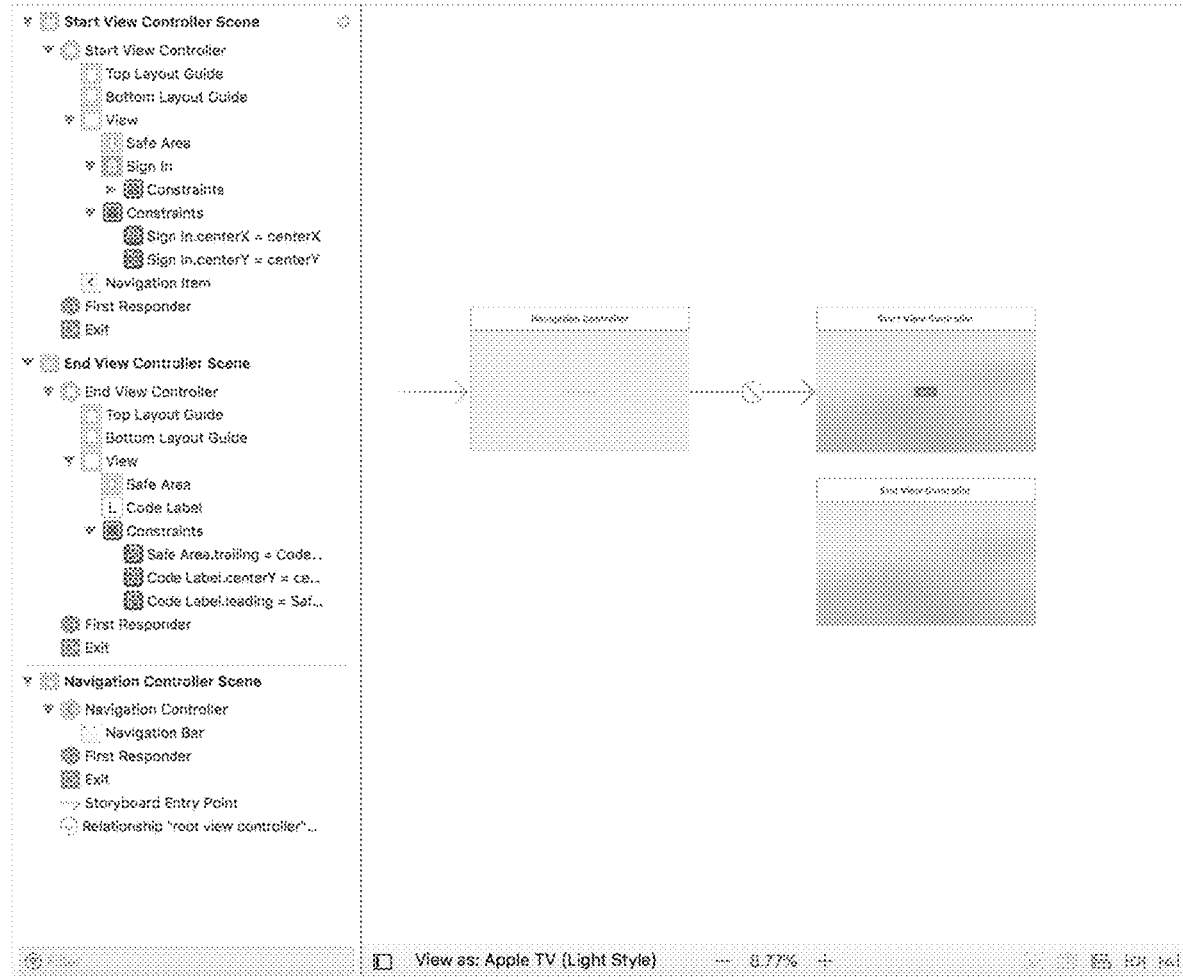
FIG. 9 illustrates an example of tvOS storyboard.

FIG. 8 is a screenshot illustrating an example of the iOS App storyboard. FIG. 9 is a screenshot illustrating an example of tvOS storyboard.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for authenticating a viewing device for rendering digital content, the system comprising:
   one or more hardware processors configured by machine-readable instructions to:
   display an initial display on the viewing device;
   receive, by the viewing device, a request to view content;
   transmit, by the viewing device, an indication of the request to a mobile device associated with a user who is authorized to view the content, the mobile device being a device that is different from the viewing device, whereby the mobile device generates a message to be displayed to the user, the message prompting the user to approve the viewing device, wherein the indication of the request is transmitted directly from the viewing device to the mobile device over a local network;
   verify, by the viewing device, that the user is logged into an account service that includes a user database;
   in response to the verifying, the viewing device storing a key in the user database;
   receive, from the mobile device, approval of the viewing device for viewing the content, wherein the approval is transmitted directly from the mobile device to the viewing device over the local network; and
   authenticate, by the mobile device, the viewing device for viewing the content in response to the approval by consuming the key, whereby the content can be viewed on the viewing device.

2. The system of claim 1, wherein the content is subject to a subscription requirement and the user has subscribed to the content.

3. The system of claim 1, wherein the message generated by the mobile device is a push notification.

4. The system of claim 3, wherein the push notification provides the user with the options of opening an app associated with the content, logging in to a service associated with the content, or dismissing the push notification.

5. The system of claim 1, wherein the key includes an authorization code.

6. The system of claim 5, wherein the step of transmitting an indication of the request includes transmitting the authorization code to the mobile device.

7. The system of claim 3, wherein the one or more hardware processors are further configured by machine-readable instructions to set a state variable stored in the mobile device to a state indicating that the push notification should be generated, the push notification being generated in response to detection of the state of the state variable.

8. A method of authenticating a viewing device for rendering digital content,
the method comprising:
displaying an initial display on the viewing device;
receiving, by the viewing device, a request to view content;
transmitting, by the viewing device, an indication of the request to a mobile device associated with a user who is authorized to view the content, the mobile device being a device that is different from the viewing device, whereby the mobile device generates a message to be displayed to the user, the message prompting the user to approve the viewing device, wherein the indication of the request is transmitted directly from the viewing device to the mobile device over a local network;
verifying, by the viewing device, that the user is logged into an account service that includes a user database;
in response to the verifying, the viewing device storing a key in the user database;
receiving, from the mobile device, approval of the viewing device for viewing the content, wherein the approval is transmitted directly from the mobile device to the viewing device over the local network; and
authenticating, by the mobile device, the viewing device for viewing the content in response to the approval by consuming the key whereby the content can be viewed on the viewing device.

9. The method of claim 8, wherein the content is subject to a subscription requirement and the user has subscribed to the content.

10. The method of claim 8, wherein the message generated by the mobile device is a push notification.

11. The method of claim 10, wherein the push notification provides the user with the options of opening an app associated with the content, logging in to a service associated with the content, or dismissing the push notification.

12. The method of claim 8, wherein the key includes an authorization code.

13. The method of claim 12, wherein the step of transmitting an indication of the request includes transmitting the authorization code to the mobile device.

14. The method of claim 10, further comprising, setting a state variable stored in the mobile device to a state indicating that the push notification should be generated, the push notification being generated in response to detection of the state of the state variable.

15. A non-transient computer-readable storage medium having instructions embodied thereon, the instructions being executable by one or more processors to perform a method for authenticating a remote viewing device for rendering digital content, the method comprising:
displaying an initial display on the viewing device;
receiving, by the viewing device, a request to view content;
transmitting, by the viewing device, an indication of the request to a mobile device associated with a user who is authorized to view the content, the mobile device being a device that is different from the viewing device, whereby the mobile device generates a message to be displayed to the user, the message prompting the user to approve the viewing device, wherein the indication of the request is transmitted directly from the viewing device to the mobile device over a local network;
verifying, by the viewing device, that the user is logged into an account service that includes a user database;
in response to the verifying, the viewing device storing a key in the user database;
receiving, from the mobile device, approval of the viewing device for viewing the content, wherein the approval is transmitted directly from the mobile device to the viewing device over the local network; and
authenticating, by the mobile device, the viewing device for viewing the content in response to the approval by consuming the key whereby the content can be viewed on the viewing device.

16. The computer-readable storage medium of claim 15, wherein the content is subject to a subscription requirement and the user has subscribed to the content.

17. The computer-readable storage medium of claim 15, wherein the message generated by the mobile device is a push notification.

18. The computer-readable storage medium of claim 17, wherein the push notification provides the user with the options of opening an app associated with the content, logging in to a service associated with the content, or dismissing the push notification.

19. The computer-readable storage medium of claim 15, wherein the key includes an authorization code.

20. The computer-readable storage medium of claim 19, wherein the step of transmitting an indication of the request includes transmitting the authorization code to the mobile device.

21. The computer-readable storage medium of claim 17, wherein the method further comprises, setting a state variable stored in the mobile device to a state indicating that the push notification should be generated, the push notification being generated in response to detection of the state of the state variable.

22. The system of claim 1, wherein the local network is defined by a sign in connector application executing on the viewing device and configured to broadcast a key associated with the viewing device over a wireless connection, and a host application executing on the mobile device and being configured to listen for a key associated with the viewing device and receive the key and wherein the approval is responsive to the host application consuming the key.

23. The system of claim 1, wherein the local network used the BONJOUR™ protocol.

24. The method of claim 8, wherein the local network is defined by a sign in connector application executing on the viewing device and configured to broadcast a key associated with the viewing device over a wireless connection, and a host application executing on the mobile device and being configured to listen for a key associated with the viewing device and receive the key and wherein the approval is responsive to the host application consuming the key.

25. The method of claim 8, wherein the local network used the BONJOUR™ protocol.

26. The media of claim 15, wherein the local network is defined by a sign in connector application executing on the viewing device and configured to broadcast a key associated with the viewing device over a wireless connection, and a host application executing on the mobile device and being configured to listen for a key associated with the viewing device and receive the key and wherein the approval is responsive to the host application consuming the key.

27. The media of claim 15, wherein the local network used the BONJOUR™ protocol.

\* \* \* \* \*